(12) United States Patent  
Zhang et al.

(10) Patent No.: US 8,306,180 B2  
(45) Date of Patent: Nov. 6, 2012

(54) IMAGE RECONSTRUCTION METHOD FOR HIGH-ENERGY, DUAL-ENERGY CT SYSTEM

(75) Inventors: Li Zhang, Beijing (CN); Zhiqiang Chen, Beijing (CN); Kejun Kang, Beijing (CN); Haifeng Hu, Beijing (CN); Yuxiang Xing, Beijing (CN); Xinhui Duan, Beijing (CN); Yuanjing Li, Beijing (CN); Yinong Liu, Beijing (CN); Qingping Huang, Beijing (CN)

(73) Assignees: Tsinghua University (CN); Nuctech Company Limited (CN)

( * ) Notice: Subject to any disclaimer, the term of this patent is extended or adjusted under 35 U.S.C. 154(b) by 0 days.

(21) Appl. No.: 12/509,977

(22) Filed: Jul. 27, 2009

(65) Prior Publication Data

US 2010/0040192 A1   Feb. 18, 2010

(30) Foreign Application Priority Data

Aug. 13, 2008  (CN) .......................... 2008 1 0118304

(51) Int. Cl.
*A61B 6/00* (2006.01)
*G01N 23/04* (2006.01)

(52) U.S. Cl. .................... 378/5; 378/4; 378/57
(58) Field of Classification Search .................. 378/4, 5, 378/98.9, 98.11, 98.12
See application file for complete search history.

(56) References Cited

U.S. PATENT DOCUMENTS

| | | | | |
|---|---|---|---|---|
| 3,848,130 A | * | 11/1974 | Macovski | 378/98.9 |
| 3,965,358 A | * | 6/1976 | Macovski | 378/5 |
| 4,029,963 A | * | 6/1977 | Alvarez et al. | 378/5 |
| 4,571,491 A | * | 2/1986 | Vinegar et al. | 250/252.1 |
| 4,686,695 A | * | 8/1987 | Macovski | 378/146 |
| 5,123,037 A | * | 6/1992 | Picard et al. | 378/98.2 |
| 5,155,365 A | * | 10/1992 | Cann et al. | 250/363.02 |
| 5,247,559 A | * | 9/1993 | Ohtsuchi et al. | 378/53 |
| 5,481,584 A | * | 1/1996 | Tang et al. | 378/98.9 |
| 5,490,218 A | * | 2/1996 | Krug et al. | 382/100 |

(Continued)

FOREIGN PATENT DOCUMENTS

EP    1970731 A2    9/2008

(Continued)

OTHER PUBLICATIONS

Alvarez et al., Energy-selective Reconstructions in X-ray Computerized Tomography, Phys Med Biol, 1976, vol. 21, No. 5, pp. 733-744.*

(Continued)

*Primary Examiner* — Alexander H Taningco
(74) *Attorney, Agent, or Firm* — Schwegman Lundberg & Woessner, P.A.

(57) ABSTRACT

Disclosed is an image reconstruction method in a high-energy dual-energy CT system. The method comprises steps of scanning an objection with high-energy dual-energy rays to obtain high-energy dual-energy projection values, calculating projection values of base material coefficients corresponding to the dual-energy projection values on the basis of a pre-created lookup table or by analytically solving a set of equations, and obtaining an image of base material coefficient distribution based on the projection values of base material coefficients. The method provides a solution for reconstruction with high-energy dual energy CT technology and thus a more effective approach for substance identification and contraband inspection, thereby bringing a significant improvement on accuracy and efficiency in security inspection.

6 Claims, 2 Drawing Sheets

U.S. PATENT DOCUMENTS

| | | | | |
|---|---|---|---|---|
| 5,524,133 | A | * | 6/1996 | Neale et al. .................. 378/53 |
| 6,069,936 | A | * | 5/2000 | Bjorkholm ................ 378/98.9 |
| 6,173,034 | B1 | * | 1/2001 | Chao .............................. 378/37 |
| 6,324,240 | B1 | * | 11/2001 | Yan et al. ........................ 378/4 |
| 6,574,302 | B2 | * | 6/2003 | Adriaansz ...................... 378/54 |
| 6,735,273 | B2 | * | 5/2004 | Flohr et al. ...................... 378/5 |
| 6,987,833 | B2 | * | 1/2006 | Du et al. ..................... 378/98.9 |
| 7,050,530 | B2 | * | 5/2006 | Heismann ........................ 378/5 |
| 7,453,987 | B1 | | 11/2008 | Richardson |
| 7,570,737 | B2 | * | 8/2009 | Kang et al. .................... 378/57 |
| 2004/0184574 | A1 | * | 9/2004 | Wu et al. .......................... 378/5 |
| 2005/0058242 | A1 | | 3/2005 | Peschmann |
| 2005/0084069 | A1 | * | 4/2005 | Du et al. ..................... 378/98.9 |
| 2005/0259781 | A1 | * | 11/2005 | Ying et al. ...................... 378/5 |
| 2006/0269043 | A1 | * | 11/2006 | Heismann ...................... 378/62 |
| 2008/0170655 | A1 | | 7/2008 | Bendahan |
| 2008/0181357 | A1 | | 7/2008 | Bendahan |
| 2009/0067574 | A1 | | 3/2009 | Johnson |

FOREIGN PATENT DOCUMENTS

| | | |
|---|---|---|
| GB | 2438278 A | 11/2007 |
| GB | 2453641 A | 4/2009 |
| GB | 2453642 A | 4/2009 |
| GB | 2454782 A | 5/2009 |
| WO | WO-01/09596 A1 | 2/2001 |
| WO | WO-01/96844 A1 | 12/2001 |
| WO | WO-2004/053472 A1 | 6/2004 |
| WO | WO-2008/142446 A2 | 11/2008 |
| WO | WO-2009/024817 A1 | 2/2009 |

OTHER PUBLICATIONS

Lehmann et al., Generalized image combinations in dual KVP digital radiography, Med Phys, 8, 5, 1981, pp. 659-667.*

"Chinese Application Serial No. 200810118304.2, Office Action dated Jul. 25, 2011", (w. English Summary), 4 pgs.

"Chinese Application Serial No. 200810118304.2, Office Action dated Aug. 20, 2010", (w/ English Summary), 7 pgs.

"German Application Serial No. 102009028104.5, Office Action dated Sep. 21, 2011", (w/ English Translation), 7 pgs.

"Great Britain Application Serial No. GB0913737.3, Combined Search and Examination Report mailed Oct. 29, 2009", 7 pgs.

"Great Britain Application Serial No. GB0913737.3, Examination Report dated Sep. 16, 2010", 2 pgs.

Chuang, K.-S., et al., "A fast dual-energy computational method using isotransmission lines and table lookup", *Med. Phys. 14(2)*, (1987), 186-192.

Ogorodnikov, S., et al., "Processing of interlaced images in 4-10 MeV dual energy customs system for material recognition", *Physical Review Special Topics-Accelerators and Beams, 5*, (2002), 104701-1-104701-11.

Tang, X., et al., "Application of dual-energy DR method for material recognition in CT image system", *Chinese Journal of Stereology and Image Analysis, 12(2)*, (w/ English Abstract), (2007), 88-92.

Zhang, G., et al., "A practical reconstruction method for dual energy computed tomography", Journal of X-Ray Science and Technology, 16, (2008), 67-88.

* cited by examiner

IMAGE RECONSTRUCTION METHOD FOR HIGH-ENERGY, DUAL-ENERGY CT SYSTEM

RELATED APPLICATION

This application claims the benefit of priority, under 35 U.S.C. Section 119, to Chinese Patent Application Serial No. 200810118304.2, filed on Aug. 13, 2008, which is incorporated herein by reference in its entirety.

BACKGROUND OF THE INVENTION

1. Field of Invention

The present invention relates to radiography technology, in particular to an image reconstruction method for a dual-energy CT image with high-energy X-rays.

2. Description of Prior Art

Computerized Tomography (CT) technique has been widely applied in the fields of medical diagnosis and industrial lossless detection. Demand for the CT technique, including application of a huge number of X-ray imaging-based CT imaging systems (hereafter referred to as XCT system for short), in public security and social safeguard is also growing with the evolution of the society. The XCT systems can be categorized into mono-energy CT and dual-energy CT in terms of the utilized imaging techniques. The mono-energy and dual-energy XCTs, of which the techniques are relatively sophisticated, are mainstream XCTs in reality applications, though multi-energy X-ray imaging technique has made some progress. The mono-energy XCT can obtain information on the internal structure and physical characteristics of an object by reconstructing an attenuation coefficient image of the tomogram of the object, while it cannot distinguish and determine exactly what substance is comprised in the object. On the other hand, the dual-energy XCT can obtain not only information on the attenuation coefficient of the substance within the object but also information on composition of the substance through the reconstruction approach. For example, typical information on composition of the substance is effective atomic number and equivalent characteristic density of a substance. With such information, it is possible to perform substance recognition with a high accuracy and thus to provide an efficient inspection approach in the field of public security.

Dual-energy XCT technology has entered a relatively sophisticated stage and been widely used in the medical imaging and security inspection on small-sized objects. In most of dual-energy XCT systems, X-rays of low-energy, generally below 200 KeV, are commonly used in imaging. The reasons for choosing a low energy spectrum are that: first, it is easier to generate X-rays of low-energy by an X-ray tube, and protection against radiation can be implementation in a simpler way for X-rays of low-energy; second, the attenuation coefficients of different substances vary greatly in this energy spectrum, and thus the image of a substance has a better distinguishability; last, the scanned object is usually of a small size and causes less attenuation to X-rays, which enables the application of dual-energy XCT systems utilizing low-energy X-rays.

In security inspection on bulk cargoes, however, the penetrating ability of X-rays in the lower energy spectrum is far from sufficiency, and thus it is impossible to obtain clear and usable projection data for image reconstruction. In general, X-rays in the energy spectrum of MeV order, ranging from 1 to 10 MeV, are required for X-ray radiography. The conventional low-energy, dual-energy reconstruction methods are not suitable for the MeV-order energy spectrum any more, due to a fundamental fact that, in these method, the interaction between X-rays and a substance will result in only two types of effects, photoelectric effect and Compton scatter, without electron pair effect. On the other hand, in the application of high-energy, dual-energy technology, X-rays generally possess a greater energy than the lowest energy 1.02 MeV produced by the electron pair effect. As a result, the conventional methods based on the above two types of effects cannot be adopted any more, and it is desirable to develop new technology for the high-energy, dual-energy application.

SUMMARY OF THE INVENTION

The object of the present invention is to provide a dual-energy CT reconstruction method based on high-energy X-rays (higher than 1 MeV), which addresses the issue of dual-energy XCT inspection on large-sized cargoes. With the method of the present invention, it is possible to accurately and efficiently acquire atomic number and characteristic density tomogram for material identification, and thus to provide a highly effective method for security inspection on large-sized cargoes.

The dual-energy CT system of the present invention can use a ray source and a detector which can obtain dual-energy information, obtain projection data by using a standard CT circle track or any other suitable data acquisition approach, and utilize the projection data to reconstruct a tomogram.

According to an aspect of the present invention, an image reconstruction method in a high-energy dual-energy CT system is provided, comprising steps of scanning an objection with high-energy dual-energy rays to obtain high-energy dual-energy projection values, calculating projection values of base material coefficients corresponding to the dual-energy projection values on the basis of a pre-created lookup table or by analytically solving a set of equations, and obtaining an image of base material coefficient distribution based on the projection values of base material coefficients.

Preferably, the high-energy dual-energy rays have energy higher than 1 MeV.

Preferably, the lookup table is created by selecting two different base materials, calculating projection values with dual-energy rays penetrating the two base materials under different combinations of thickness, and creating a lookup table in a form of correspondence between high- and low-energy projection values and the different combinations of thickness.

Preferably, analytically solving a set of equations comprises acquiring a corresponding combination of thickness by solving a high- and low-energy projection set of equations under base material decomposition using the high-energy dual-energy projection values actually obtained.

Preferably, the atomic number and characteristic density are equivalent physical quantity in the case that the object contains a mixture or a compound.

Preferably, the image reconstruction method further comprises a step of calculating an atomic number image of the detected object based on the image of base material coefficient distribution.

Preferably, the image reconstruction method further comprises a step of calculating a characteristic density image of the detected object based on the image of base material coefficient distribution.

Preferably, the image reconstruction method further comprises a step of calculating an attenuation coefficient image of the detected object based on the image of base material coefficient distribution.

The method of the present invention provides a solution for reconstruction with high-energy dual energy CT technology and thus a more effective approach for substance identification and contraband inspection, thereby bringing a significant improvement on accuracy and efficiency in security inspection.

BRIEF DESCRIPTION OF THE DRAWINGS

The above advantages and features of the present invention will be apparent from the following detailed description taken conjunction with the drawings in which.

DETAILED DESCRIPTION OF THE PREFERRED EMBODIMENTS

Figure 1:
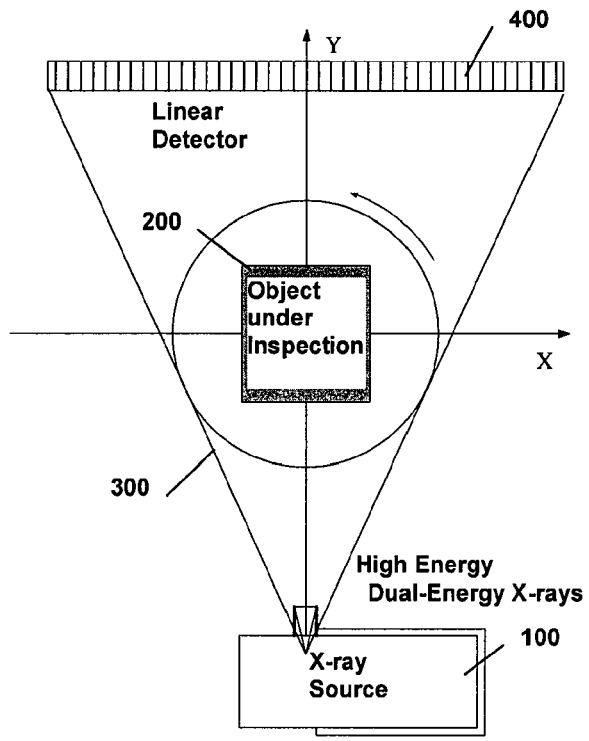
FIG. 1 is a schematic diagram of a CT scanning system to which the present invention is applicable, the system utilizing a fan-beam circle trajectory scanning scheme.

Now, a detailed description will be given to the preferred embodiments of the present invention with reference to the figures, throughout which like reference signs denote identical or similar component, though illustrated in different figures. For clarity and conciseness, specific description of any known function or structure incorporated here will be omitted otherwise the subject of the present invention may be obscured.

Mathematic Principle for CT

Subjecting a 2D distribution u(x,y) to line integration along a direction θ will result in a 1D function $p_θ(t)$ which is referred to as the projection of u(x,y) at an angle of θ. If the projection $p_θ(t)$ along respective directions can be obtained, the 2D distribution u(x,y) can be calculated accurately based on Radon transformation. The procedure of deriving a 2D distribution from its projection is called reconstruction, which acts as the mathematic principle for CT.

In practice, after an X-ray and a detector go round an object for one cycle, there measured and obtained the projections of the attenuation coefficient distribution along respective directions for some slice of the object, and the 2D distribution of attenuation coefficients of the object slice can be reconstructed on the basis of the CT principle.

Base Material Decomposition Model

The linear attenuation coefficient of a material with respect to X-rays can be represented by a sum of linear attenuation coefficients of three primary effects with the following expression:

$$\mu = \mu_p + \mu_c + \mu_e = a_1 f_p(E) + a_2 f_{KN}(E) + a_3 f_e(E),$$

in which μ represents the linear attenuation coefficient of a material with respect to X-rays, $\mu_p, \mu_c, \mu_e$ represents linear attenuation coefficients corresponding to photoelectric, Compton scatter and electron pair effect, respectively. Each item of $\mu_p, \mu_c, \mu_e$ can be approximated as a product of two items, a and f(E), the coefficient a depending on the atomic number and density of the material, and f(E) depending on the energy of X-rays.

As shown in theoretical analysis and experiments of material attenuation coefficient, the photoelectric effect makes a contribution much less than the other effects in a high energy situation, and thus the effect can be neglected in calculation. As a result, the above expression is simplified as $$\mu = \mu_c + \mu_e = a_2 f_{KN}(E) + a_3 f_e(E).$$

Since the linear attenuation coefficient of each material can be uniquely determined by the two coefficients, $a_2$ and $a_3$, two base materials, such as carbon and aluminum, can be selected so as to represent the linear attenuation coefficient of any other material with a linear combination of the linear attenuation coefficients of these base materials, as illustrated in the following expression:

$$\mu = \mu_c + \mu_e = b_1 \mu_1 + b_2 \mu_2 \quad (1),$$

in which μ denotes the linear attenuation coefficient of one arbitrary material, $\mu_1, \mu_2$ are the linear attenuation coefficients of the selected base material, $b_1$ and $b_2$ are called base material coefficients. This is exactly a kernel expression in base material decomposition. The above $a_2, a_3$ are defined as $$a_2 = 2\rho \frac{Z}{A}, \ a_3 = 2\rho \frac{Z^2}{A},$$

in which ρ represents the material's density, Z represents the material's atomic number, and A denotes the material's atomic mass number. Subsequently, a formula for calculating effective atomic number and characteristic density through a base material decomposition scheme can be derived as:

$$Z_{eff} = \frac{b_1 \rho_{e1} Z_1 + b_2 \rho_{e2} Z_2}{b_1 \rho_{e1} + b_2 \rho_{e2}} \quad (2)$$

$$\rho_e = b_1 \rho_{e1} + b_2 \rho_{e2}$$

Base Material Projection Model

The X-ray tube or the accelerator generally produces X-rays with a continuous energy spectrum. During the process of X-ray projection, the ray source energy spectrum and the detector spectrum can be combined into D(E) for the purpose of simplifying the calculation process. The combined D(E) satisfies the normalization condition as:

$$\int_0^{E_m} D(E) dE = 1$$

For a projection equation, it can be rewritten in the form of a continuous spectrum $$p = -\ln \frac{I}{I_0} = -\ln \int_0^{E_m} D(E) \exp\left(-\int_l \mu(E, x, y) dl\right) dE$$

The dual-energy projection can be expressed in the following by substituting a base material decomposition model into the above expression $$p_1(B_1, B_2) = -\ln \int D_1(E) \exp[-B_1 \mu_1(E) - B_2 \mu_2(E)] dE$$

$$p_2(B_1, B_2) = -\ln \int D_2(E) \exp[-B_1 \mu_1(E) - B_2 \mu_2(E)] dE \quad (3)$$

in which $p_1, p_2$ represent projections at dual energy levels, a high-energy projection and a low-energy projection, respectively, $D_1$, $D_2$ represent X-ray system energy spectrums at high and low energy level, and each of $B_1$, $B_2$ is thickness of the base material defined as:

$$B_1 = \int b_1(\vec{r})dl$$

$$B_2 = \int b_2(\vec{r})dl.$$

The projection values of base material coefficients, $B_1$ and $B_2$ can be acquired with a lookup table or by solving the above set of equations (3) directly. Then, the base material coefficients $b_1$ and $b_2$ can be obtained with a generic filtering inverse projection reconstruction algorithm, $$M_1(t) = \int_{-\infty}^{+\infty} B_1(\rho, \theta)|\rho|e^{2\pi j\rho t}\,d\rho$$

$$M_2(t) = \int_{-\infty}^{+\infty} B_2(\rho, \theta)|\rho|e^{2\pi j\rho t}\,d\rho$$

$$b_1 = \int_0^\pi d\theta \int_{-\infty}^{+\infty} M_1(t)\delta(x\cos\theta + y\sin\theta - t)\,dt$$

$$b_2 = \int_0^\pi d\theta \int_{-\infty}^{+\infty} M_2(t)\delta(x\cos\theta + y\sin\theta - t)\,dt,$$

in which $(\rho,\theta)$ represents radial and angular coordinates for the projection values.

The atomic number $Z_{eff}$ and the characteristic density $\rho_e$ can be obtained with the above equation (2), and the image of linear attenuation coefficient at any energy level can be obtained with the above equation (1).

FIG. 1 is a schematic diagram of a dual-energy CT system according to an embodiment of the present invention. As shown in FIG. 1, a ray source 100 generates dual-energy X-rays having a continuous energy distribution at predefined timing under the control of a controller 500. The object 200 is placed on a bearing mechanism 300, which can rotate uniformly and be lifted up and down under the control of the controller 500. An array of detectors 400 is arranged at a position opposite to the ray source 100, and receives the penetrative rays, which have traveled through the object 200, under the control of the controller 500 so as to obtain detection signals for a first energy level and detection signals for a second energy level. The signals detected by the detector array 400 are converted into digital signals and stored in a computer for subsequent reconstruction processing.

In the embodiment of the present invention, (1) The X-ray source 100 comprises a high-energy dual-energy accelerator ray source, which can produce X-rays at two high voltage levels in a rapid and alternative manner. With respect to large-sized cargoes, the use of an accelerator ray source can produce rays of higher power to ensure a clearer reconstructed image.

(2) The bearing mechanism 300 can be, for example, an object-bearing platform which rotates steadily and stably.

(3) The linear array of detectors 400 is deployed in a horizontal direction while being kept perpendicular to an axis across the center of the X-ray source 100 and the bearing mechanism 300.

(4) Mechanical/electrical control, data transmission and image reconstruction of the overall CT system are fulfilled by a computer work station. The work station performs reconstruction of a tomogram, which is subsequently displayed on a display in 2 or 3 dimensions.

(5) For the purpose of an accurate image reconstruction, the CT system measures or calibrates precisely system parameters including distance D from the X-ray source to a detector, distance R from the X-ray source to the rotation axis of the object-bearing platform, position c at which the X-ray source is mapped onto a detector, pixel size d of a detector, the precise geometric position $x_i$ of each of the detectors, and the rotation angle $\theta$ of the platform.

(6) The scanning scheme used in the system is a standard fan-beam circle trajectory scanning scheme, in which the ray source and the detectors are fixed at a height while the object moves together with the rotation of the object-bearing platform. The dual-energy CT projection data is collected each rotation the object moves.

(7) With the above image reconstruction process, the atomic number image and the characteristic image of the material can be obtained by a computer from the dual-energy CT projection data of a scanned object. The obtained images provide a basis for subsequent material identification and determination.

Figure 2:
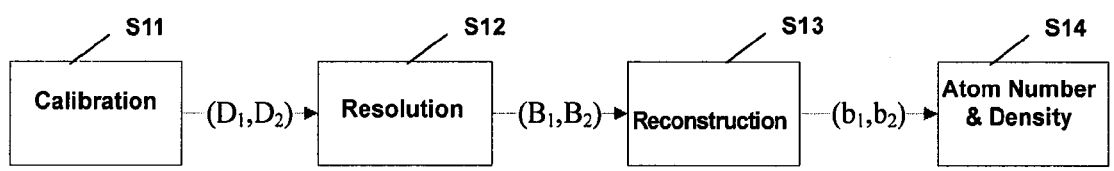
FIG. 2 is a calculation flowchart depicting the image reconstruction method of the present invention, in which data shown on each of the arrows connecting the respective flow block represent a result from the previous flow block, which will be taken as input data to the next flow block.

Now, details of the image reconstruction method according to the embodiment of the present invention will be described in connection with FIG. 2.

At step S11, dual-energy rays are used in scanning the object to obtain the dual-energy projection values.

At step S12, the projection values of base material coefficients corresponding to the dual-energy projection values are calculated on the basis of a pre-created lookup table or by analytically solving a set of equations. The lookup table can be created by selecting two different base materials, calculating projection values with dual-energy rays penetrating the two base materials under different combinations of thickness, and creating a lookup table in a form of correspondence between high- and low-energy projection values and the different combinations of thickness. On the other hand, analytically solving a set of equations can be realized by acquiring a corresponding combination of thickness by solving a high- and low-energy projection set of equations under base material decomposition using the high-energy dual-energy projection values actually obtained. The latter analytical solution of an equation set, though providing a higher accuracy, requires a long time period of calculation. Considering the slow calculation, a lookup table is thus preferably used in practical applications.

At step S13, an image of base material coefficient distribution can be obtained from the projection values of the base material.

At step S14, the atomic number image and characteristic density image of the detected object as well as the attenuation coefficient image of the detected object at an arbitrary energy level can be derived from the image of base material coefficient distribution. This step is implemented in a hardware system. With these steps, the present invention establishes a base material decomposition dual-energy CT reconstruction method with high-energy X-rays, which method can derive the atomic number and characteristic density images of a tomogram from the dual-energy projection in a more accurate manner. The derived atomic number and characteristic density are equivalent physical quantity in the case that the detected object contains a mixture or a compound.

Figures 3A, 3B:
FIGS. 3A and 3B show an atomic number image and a characteristic density image obtained by a stimulated image reconstruction, respectively, using a single model of graphite.
Figure 3C:
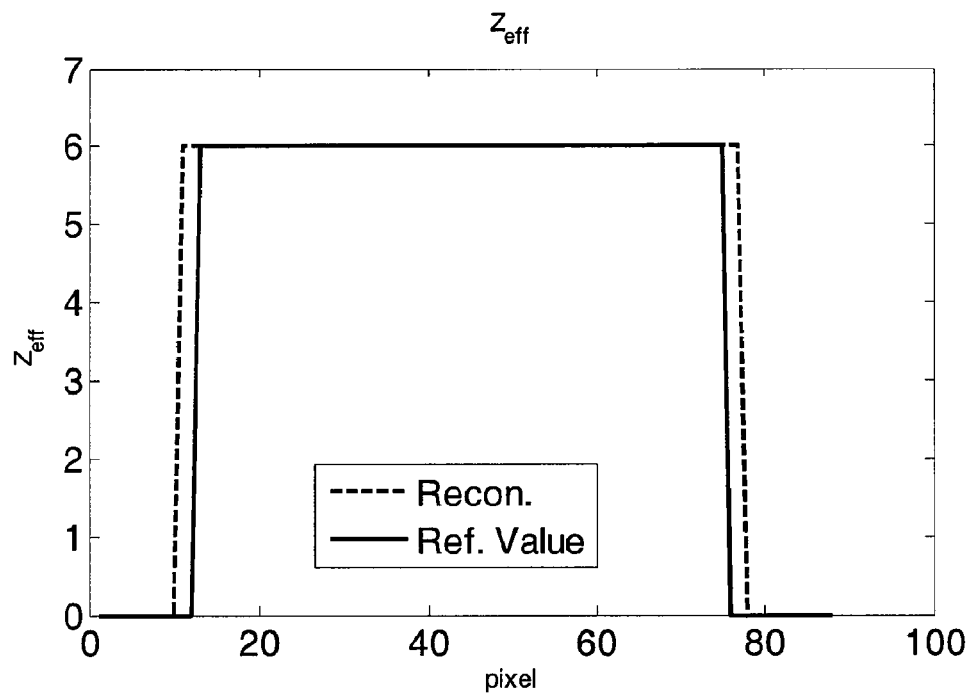
FIGS. 3C and 3D show comparisons between the reconstructed atomic number image and characteristic density image and theoretical values, respectively.
Figure 3D:
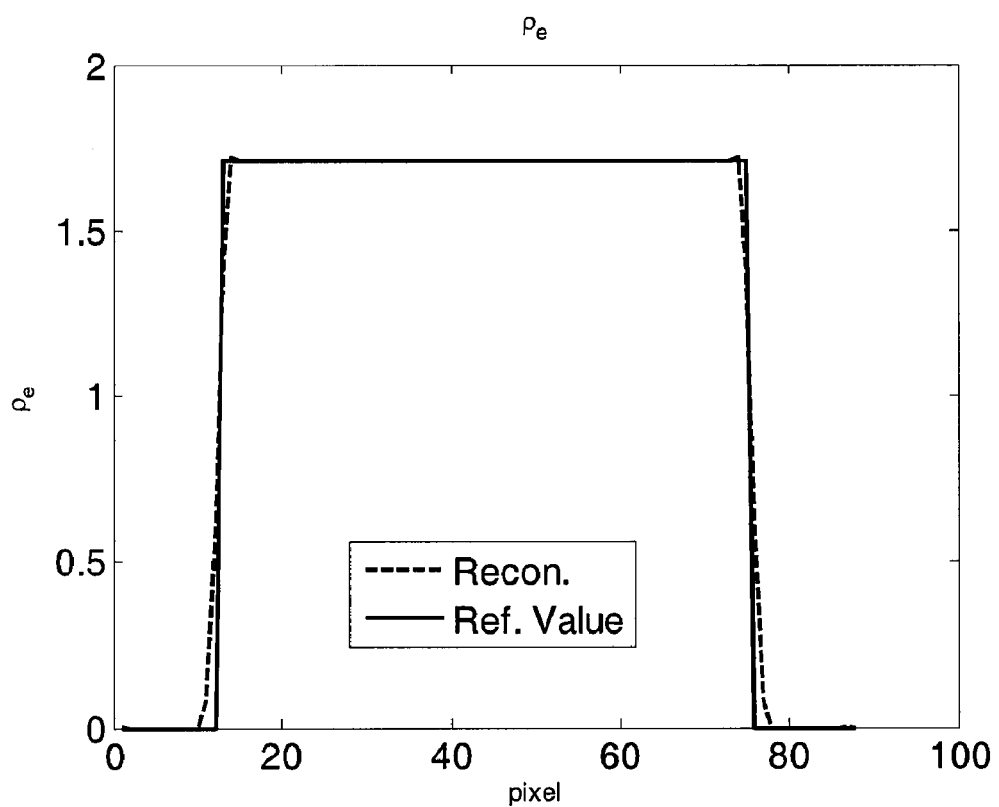

FIGS. 3A to 3D show part of experimental results obtained by simulation experiments with a single graphite model. FIGS. 3C and 3D show sectional diagram of the atomic number and characteristic density images in a horizontal direction, respectively, wherein the dotted line denotes reconstructed values, and the solid line denotes theoretical values.

As a generic image reconstruction method in the case of high-energy dual-energy condition, the present invention is applicable to any dual-energy CT system using high-energy X-rays as ray source. Therefore, the present invention is expected to have a bright prospect in a larger range of applications.

The foregoing description is only intended to illustrate the embodiments of the present invention other than limiting the present invention. For those skilled in the art, any change or substitution that can be made readily within the scope of the present invention should be encompassed by the scope of the present invention. Therefore, the scope of the present invention should be defined by the claims.

What is claimed is:

1. An image reconstruction method in a high-energy dual-energy CT system for cargo inspection comprising:

scanning an object with high-energy dual-energy rays to obtain high-energy dual-energy projection values, wherein the high-energy dual-energy rays have energy higher than 1 MeV;

calculating projection values of base material coefficients corresponding to the dual-energy projection values on the basis of a pre-created lookup table or by analytically solving a set of equations, wherein the linear attenuation coefficient of each of the materials contained in the scanned object is represented by a linear combination of the linear attenuation coefficients of two selected base materials as in a first formula: $\mu = b_1\mu_1 + b_2\mu_2$, where $\mu$ denotes the linear attenuation coefficient of the material, $\mu_1$, $\mu_2$ are the linear attenuation coefficients of the two base materials, $b_1$ and $b_2$ are base material coefficients for the material, wherein the first formula establishes a base material decomposition model for representing the linear combination of the linear attenuation coefficients of the two selected base materials with respect to merely Compton effect and Electron pair effect;

obtaining an image of base material coefficient distribution based on the projection values of base material coefficients; and calculating both an atomic number image and a characteristic density image of the detected object based on the image of base material coefficient distribution by using the second formula:

$$Z_{\it eff} = \frac{b_1\rho_{e1}Z_1 + b_2\rho_{e2}Z_2}{b_1\rho_{e1} + b_2\rho_{e2}}$$

$$\rho_e = b_1\rho_{e1} + b_2\rho_{e2}$$

in which $\rho_{e1}$, $\rho_{e2}$ represent the two base material's densities respectively, $Z_1$, $Z_2$ represent the two base material's atomic numbers respectively, and $Z_{\it eff}$ denotes an equivalent physical quantity representing the atomic number of the scanned object, and $\rho_e$ denotes an equivalent physical quantity representing the characteristic density of the scanned object.

2. The method of claim 1, wherein in the case of using a pre-created lookup table, the lookup table is created by selecting two different base materials, calculating projection values with dual-energy rays penetrating the two base materials under different combinations of thickness, and creating a lookup table in a form of correspondence between high- and low-energy projection values and the different combinations of thickness.

3. The method of claim 1, wherein in case of analytically solving a set of equations, said analytically solving a set of equations comprises acquiring a corresponding combination of thickness by solving a high and low-energy projection set of equations under base material decomposition using the high-energy dual-energy projection values actually obtained.

4. The method of claim 1, wherein the atomic number and characteristic density are equivalent physical quantity in the case that the object contains a mixture or a compound.

5. The method of claim 1, further comprising a step of calculating an attenuation coefficient image of the detected object based on the image of base material coefficient distribution.

6. The method of 1, wherein the two selected base materials comprise carbon and aluminum.

* * * * *